United States Patent
Chen et al.

(10) Patent No.: US 9,076,404 B2
(45) Date of Patent: Jul. 7, 2015

(54) ARRAY SUBSTRATE AND 3D DISPLAY DEVICE

(71) Applicant: SHENZHEN CHINA STAR OPTOELECTRONICS TECHNOLOGY CO., LTD., Shenzhen (CN)

(72) Inventors: Chenghung Chen, Shenzhen (CN); Jiali Jiang, Shenzhen (CN)

(73) Assignee: SHENZHEN CHINA STAR OPTOELECTRONICS TECHNOLOGY CO. LTD., Shenzhen (CN)

( * ) Notice: Subject to any disclaimer, the term of this patent is extended or adjusted under 35 U.S.C. 154(b) by 51 days.

(21) Appl. No.: 14/234,406

(22) PCT Filed: Nov. 18, 2013

(86) PCT No.: PCT/CN2013/087342
§ 371 (c)(1),
(2) Date: Jan. 23, 2014

(87) PCT Pub. No.: WO2015/058434
PCT Pub. Date: Apr. 30, 2015

(65) Prior Publication Data
US 2015/0109275 A1   Apr. 23, 2015

(30) Foreign Application Priority Data

Oct. 22, 2013   (CN) .......................... 2013 1 0498911

(51) Int. Cl.
G09G 3/36      (2006.01)
G09G 3/00      (2006.01)

(52) U.S. Cl.
CPC .............. *G09G 3/3677* (2013.01); *G09G 3/001* (2013.01); *G09G 3/3659* (2013.01); *G09G 2300/0819* (2013.01); *G09G 2310/0202* (2013.01); *G09G 2320/0233* (2013.01)

(58) Field of Classification Search
CPC . G09G 3/3677; G09G 3/3648; G09G 3/3659; G09G 3/3688; G09G 3/3614; G09G 2300/0842
See application file for complete search history.

(56) References Cited

U.S. PATENT DOCUMENTS

| | | | | |
|---|---|---|---|---|
| 7,852,446 | B2* | 12/2010 | Kim | 349/143 |
| 8,564,504 | B2* | 10/2013 | Hsu et al. | 345/55 |
| 8,593,385 | B2* | 11/2013 | Lee et al. | 345/88 |
| 8,717,344 | B2* | 5/2014 | Han et al. | 345/209 |
| 2006/0208992 | A1* | 9/2006 | Akutsu et al. | 345/98 |
| 2007/0057887 | A1* | 3/2007 | Itakura et al. | 345/90 |
| 2013/0069855 | A1* | 3/2013 | Nakanishi et al. | 345/92 |

* cited by examiner

*Primary Examiner* — Kevin Nguyen
(74) *Attorney, Agent, or Firm* — Mark M. Friedman

(57) ABSTRACT

The present invention connects the first scan line of the (N+1)th set of scan lines to the second scan line of the first set of scan lines such that the vertical start pulse output signal of the first scan line of the (N+1)th set of scan lines serves as a vertical start pulse input signal of the second scan line of the first set of scan lines, and thereby turning on other second scan lines on the array substrate. The present invention can simplify the layout of the array substrate.

10 Claims, 3 Drawing Sheets

ARRAY SUBSTRATE AND 3D DISPLAY DEVICE

BACKGROUND OF THE INVENTION

1. Field of the Invention

The present invention relates to a 3D display technology, and more particularly, to an array substrate and a 3D display device.

2. Description of Prior Art

As 3D applications are gradually propagated and promoted, the demands on 3D technology are higher and higher.

3D shutter glasses often use a technology called Black Insertion or BLU Blinking Mode, which is a backlight scan mode with insertion of black pictures. In this 3D technology, when inserting the black pictures, it is often controlled by TCON (a timing controller) or SE (a converter) of a 3D display. This technology is carried out by inserting black pictures when the left-eye and right-eye signals are switched. For example, one black picture is inserted in the end of a right-eye frame and then a left-eye frame is scanned and displayed.

Because there is a need to insert black pictures when the left-eye and right-eye signals are switched, a higher fresh frequency is required. For example, the charging frequency is generally 120 Hz. However, in the black picture insertion approach, the charging frequency is 240 Hz and the charging time is reduced. This makes the display panel involve a risk of insufficient charging, and thereby making mura appeared. In the most severe cases, the display panel does not work well and the display quality of the panel is greatly affected.

To solve the aforesaid problem (i.e., insufficient charging), this technical field adopts an approach called gate doubling driving. This approach does not cut down the charging time to a half. However, the resolution of the display panel becomes a half of original resolution, and this affects the display quality. In addition, it requires TCON to provide STV signals (vertical start pulses). If the number of gate lines is increased, this implementation is more complicated and the cost is high as well.

Therefore, there is a need to solve above technical problems occurred in the existing technical skills.

SUMMARY OF THE INVENTION

Regarding this, the present invention provides an array substrate and a 3D display device for solving the technical problem of unclear images presented in displaying high-brightness pictures, resulted from only one type of grey-level picture being displayed in a BLU blinking mode with insertion of black pictures in a 3D display technology existed in conventional skills.

To solve above technical problems, the present invention constructs an array substrate, which comprises data lines extended along a column direction and scan lines and common electrode lines extended along a row direction. The data lines and the scan lines are perpendicular to each other and are arranged as a matrix so as to form a plurality of pixel units. Each pixel unit has a pixel electrode, a first thin-film transistor, and a second thin-film transistor disposed therein.

Each row of pixel units corresponds to one set of scan lines. Each set of scan lines comprises a first scan line and a second scan line. The first scan line is connected to the pixel electrode via the first thin-film transistor. The second scan line is connected to the pixel electrode via the second thin-film transistor.

Amongst, a start end of the second scan line of a first set of scan lines is connected to a tail end of the first scan line of a (N+1)th set of scan lines such that a vertical start pulse output signal of the first scan line of the (N+1)th set of scan lines serves as a vertical start pulse input signal of the second scan line of the first set of scan lines to turn on the second scan line of the first set of scan lines, in which N is a natural number greater than or equal to 1.

To solve above technical problems, the embodiments of the present invention also construct a 3D display device, which comprises an array substrate. The array substrate comprises data lines extended along a column direction and scan lines and common electrode lines extended along a row direction. The data lines and the scan lines are perpendicular to each other and are arranged as a matrix so as to form a plurality of pixel units. Each pixel unit has a pixel electrode, a first thin-film transistor, and a second thin-film transistor disposed therein.

Each row of pixel units corresponds to one set of scan lines. Each set of scan lines comprises a first scan line and a second scan line. The first scan line is connected to the pixel electrode via the first thin-film transistor. The second scan line is connected to the pixel electrode via the second thin-film transistor.

Amongst, a start end of the second scan line of a first set of scan lines is connected to a tail end of the first scan line of a (N+1)th set of scan lines such that a vertical start pulse output signal of the first scan line of the (N+1)th set of scan lines serves as a vertical start pulse input signal of the second scan line of the first set of scan lines to turn on the second scan line of the first set of scan lines, in which N is a natural number greater than or equal to 1.

In the embodiments of the present invention, the first scan line of the (N+1)th set of scan lines is connected to the second scan line of the first set of scan lines such that the vertical start pulse output signal of the first scan line of the (N+1)th set of scan lines serves as a vertical start pulse input signal of the second scan line of the first set of scan lines, and thereby turning on other second scan lines on the array substrate. There is no need to add connecting lines for inputting the vertical start pulse input signals to the second scan lines. The present invention can simplify the layout of the array substrate and reduce the costs as well.

To make above content of the present invention more easily understood, it will be described in details by using preferred embodiments in conjunction with the appending drawings.

DETAILED DESCRIPTION OF THE PREFERRED EMBODIMENTS

The following descriptions for the respective embodiments are specific embodiments capable of being implemented for illustrations of the present invention with referring to appended figures. In the descriptions of the present invention, spatially relative terms, such as "upper", "lower", "front", "back", "left", "right", "inner", "outer", "lateral", and the like, may be used herein for ease of description as illustrated in the figures. Therefore, it will be understood that the spatially relative terms are intended to illustrate for understanding the present invention, but not to limit the present invention. In the appending drawings, units having similar structures are labeled by the same reference numbers.

Figure 1:
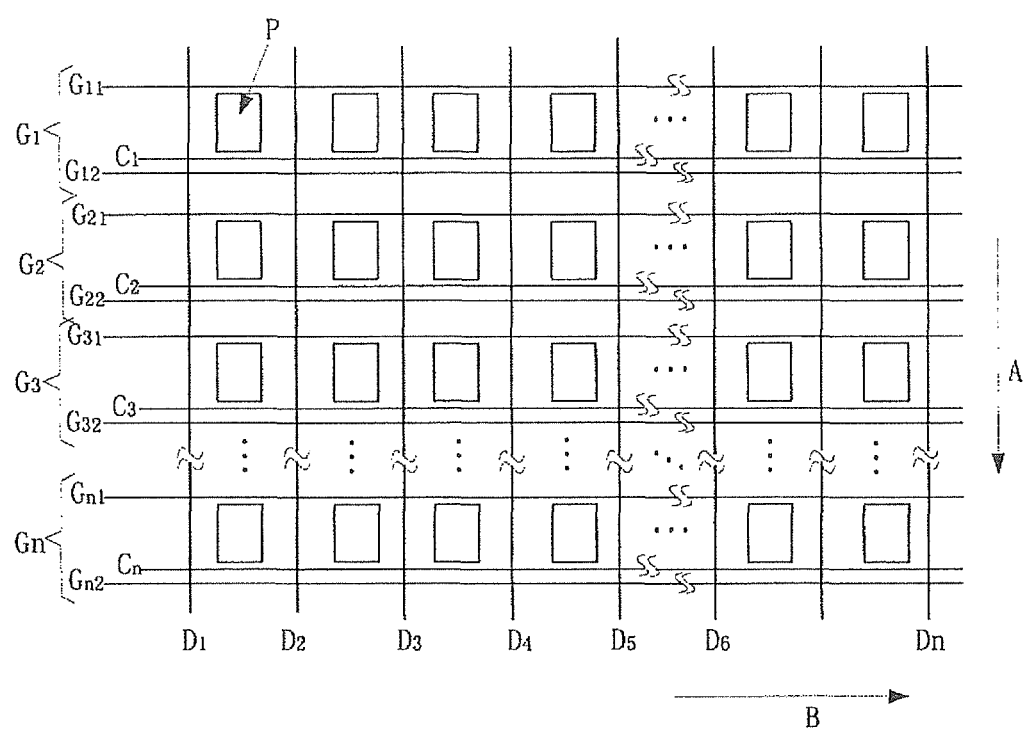
FIG. 1 is a schematic diagram showing a circuit configuration in an array substrate of the present invention.

Please refer to FIG. 1, which is a schematic diagram showing an array substrate according to a preferred embodiment of the present invention.

The array substrate comprises data lines D1, D2, . . . , Dn extended along a column direction A, and also comprises common electrode lines C1, C2, . . . , Cn and a plurality of sets of scan lines G1, G2, . . . , Gn that are extended along a row direction B (n is a natural number), in which each set of scan lines comprises a first scan line Gn1 and a second scan line Gn2.

Figure 2:
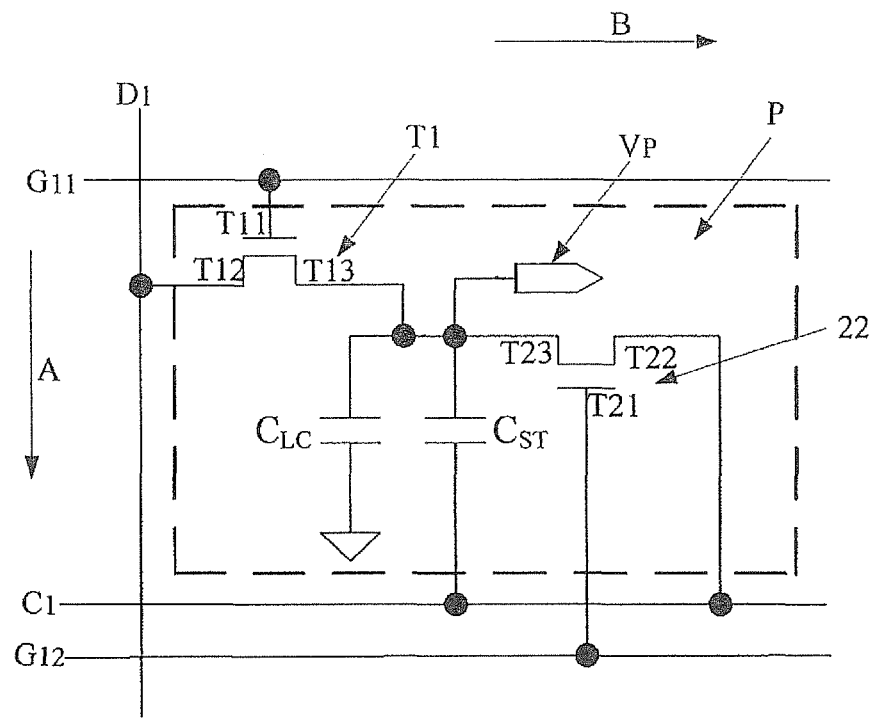
FIG. 2 is a schematic diagram showing a partial structure in an array substrate of the present invention.

The data line Dn is perpendicular to and interlaced with both of the corresponding first scan line Gn1 and second scan line Gn2 and they are arranged as a matrix so as to form a plurality of pixel units P, For example, referring to FIG. 2, the data line D1 is perpendicular to and interlaced with both of the first scan line G11 and the second scan line G12 and they are arranged as a matrix so as to form one pixel unit P. Referring to FIG. 2, FIG, 2 merely shows one single pixel unit. Other pixel units have similar structures as shown in FIG. 2 and they are not detailed herein.

Taking the pixel unit shown in FIG. 2 for example, the pixel unit P comprises a first thin-film transistor T1, a second thin-film transistor T2, a liquid crystal capacitor $C_{LC}$, and a storage capacitor $C_{ST}$, and of course comprises a pixel electrode Vp. The pixel electrode Vp shown in FIG. 2 is merely a schematic presentation. In practical implementations, the pixel electrode Vp is a layer structure parallel to the array substrate.

The first scan line G11 is connected to the pixel electrode Vp via the first thin-film transistor T1, and the second scan line G12 is connected to the pixel electrode Vp via the second thin-film transistor T2.

Specifically, the first thin-film transistor T1 comprises a gate electrode T11, a source electrode T12, and a drain electrode T13. The gate electrode T11 of the first thin-film transistor T1 is electrically connected to the first scan line G11. The source electrode T12 of the first thin-film transistor T1 is electrically connected to the data line D1. The drain electrode T13 of the first thin-film transistor T1 is electrically connected to the pixel electrode Vp.

Similarly, the second thin-film transistor T2 comprises a gate electrode T21, a source electrode T22, and a drain electrode T23. The gate electrode T21 of the second thin-film transistor T2 is electrically connected to the second scan line G12. The source electrode T22 of the second thin-film transistor T2 is electrically connected to the common electrode line C1. The drain electrode T23 of the second thin-film transistor T2 is electrically connected to the pixel electrode Vp.

Of course, connection structures of other pixels P shown in FIG. 1 are similar to that shown in FIG. 2, and they are not repeated herein.

Figure 3:
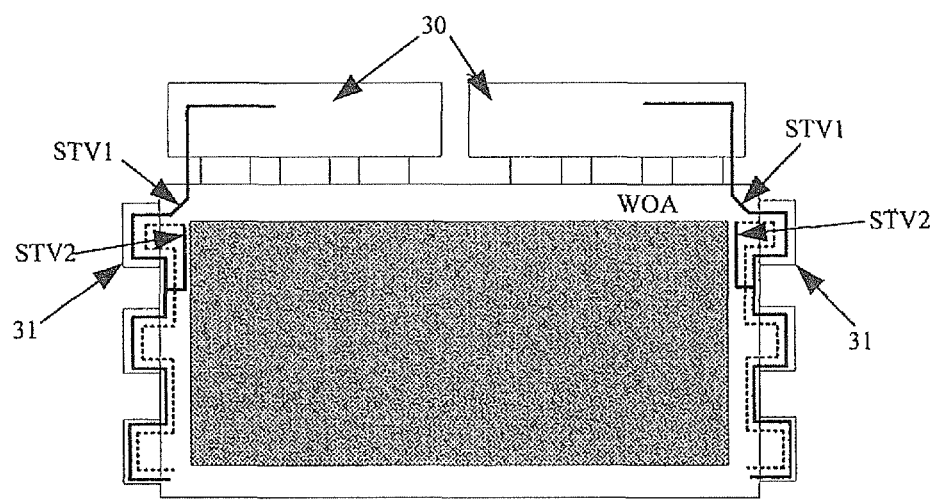
FIG. 3 is a schematic diagram showing a layout structure in an array substrate of the present invention.

Referring to FIG. 3, the array substrate further comprises gate driving chips 30 and tape chips (chip on film, COF) 31, in which the data lines Dn, the common electrode lines Cn, and the scan lines Gn are formed by extending from the tape chips 31, and are connected to the gate driving chips 30, and receives signals provided by the gate driving chips 30. In practical implementations, the gate driving chips 30 outputs two sets of STV signals (i.e., vertical start pulse signals) to turn on the first scan lines Gn1 and the second scan lines Gn2. The two sets of STV signals respectively are a first STV input signal and a second STV input signal. The first STV input signal is used to turn on the first scan lines Gn1. For example, after the first STV input signal is inputted to the first scan line G11, the first scan lines G11, G21, . . . , Gn1 are sequentially turned on. The second STV input signal is used to turn on the second scan lines Gn2. For example, after the second STV input signal is inputted to the second scan line G12, the second scan lines G12, G22, . . . , Gn2 are sequentially turned on.

Referring back to FIG. 2, after the first STV input signal turns on the first scan line G11, the first scan line G11 transmits a first scan signal so as to turn on the gate electrode T11 of the first thin-film transistor T1. The data line D1 provides a pixel electrode voltage to the pixel electrode Vp via the first thin-film transistor T1 so as to make charging achieved through the pixel electrode Vp to display a left-eye pixel image or a right-eye pixel image corresponding thereto. After charging is finished, the pixel electrode Vp maintains at an electricity remaining state. Meanwhile, the second STV input signal turns on the second scan line G12. The second scan line G12 transmits a second scan signal so as to turn on the gate electrode T21 of the second thin-film transistor T2, and the common electrode line C1 provides a common voltage to the pixel electrode Vp via the second thin-film transistor T2 so as to pull down the voltage of the pixel electrode Vp to the common voltage. In such a manner, the insertion of black pictures is carried out.

Amongst, the first scan line has a first scan period T1, and the second scan signal has a second scan period T2. It is preferred that the second scan period T2 is equal to the first scan period T1. Also, it is preferred that the second scan line G12 starts to transmit the second scan signal at (½)T of the first scan signal. Of course, it also can transmit the second scan signal at any other time. These are fallen in the protective scope of the present invention.

Referring to FIG. 3, in the embodiments of the present invention, a start end of the second scan line G12 of the first set of scan lines G1 is connected to a tail end of the first scan line G(n+1)1 of the (N+1)th set of scan lines. In such a manner, after passing the first scan line G(n+1)1 of the (N+1)th set of scan lines, the first STV input signal severs as a first STV output signal, which not only enters the first scan line G(n+2)1 of the (N+2)th set of scan lines, but also serves as the second STV input signal to turn on the second scan line G12 of the first set of scan lines G1, and thereby sequentially turning on the second scan lines G12, G22, . . . , Gn2.

That is, the vertical start pulse output signal of the first scan line G(n+1)1 of the (N+1)th set of scan lines serves as a vertical start pulse input signal of the second scan line G12 of the first set of scan lines, which is able to turn on the second scan line of the first set of scan lines, and thereby turning on other second scan lines on the array substrate. Amongst, N is a natural number greater than or equal to 1.

Preferably, it happens to (½)T when the first STV input signal passes the first scan line G(n+1)1 of the (N+1)th set of scan lines. In such a manner, the second STV input signal turns on the second scan line G12 at (½)T.

Figure 4:
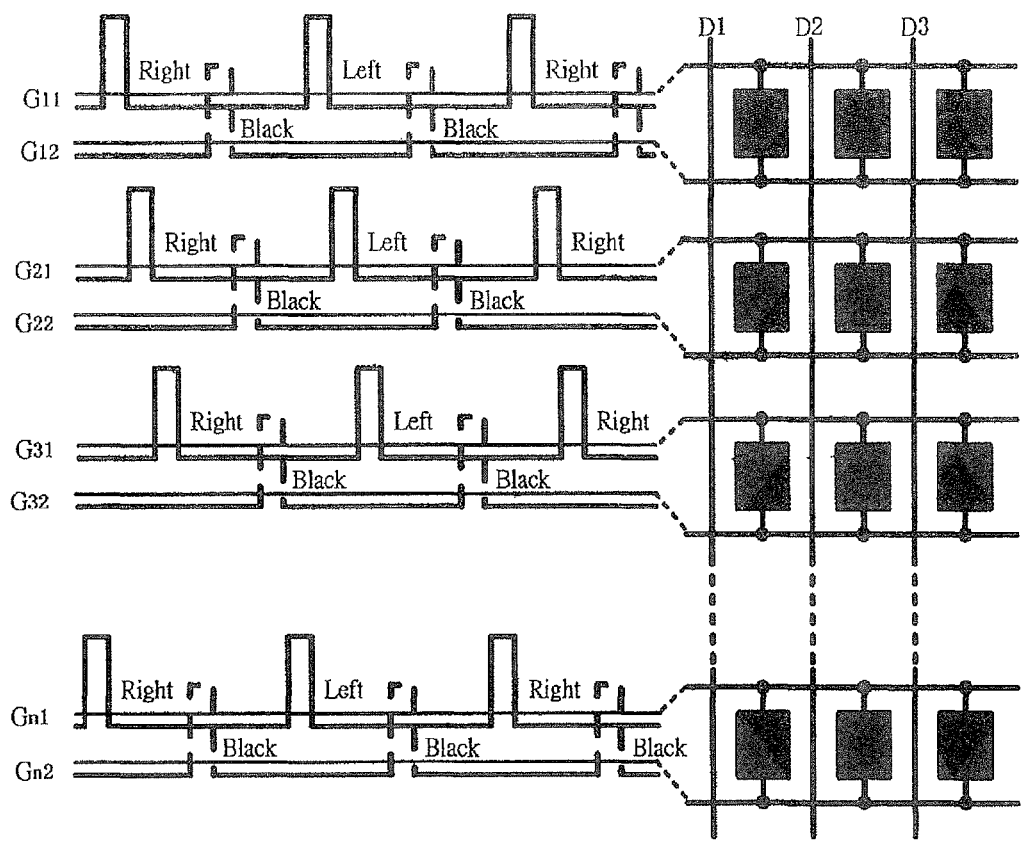
FIG. 4 is a schematic diagram showing a time sequence in an array substrate of the present invention.

Taking N=2 for example, the tail end of the first scan line G31 of the third set of scan lines G3 is connected to the start end of the second scan line G12 of the first set of scan lines G1. In such a manner, when the first STY input signal is transmitted to the third set of scan lines G3, that is, after the first scan line G31 of the third set of scan lines G3 has been scanned, the first STY input signal not only turns on the first scan line G41 of the fourth set of scan lines G4, but also turns on the second scan line G12 of the first set of scan lines, and thereby sequentially turning on the second scan lines G22, . . . , Gn2. FIG. 4 is a schematic diagram showing a time sequence in this embodiment. Amongst, it is preferred that the second scan period T2 is equal to the first scan period T1. Also, it is preferred that the second scan line starts to transmit the second scan signal at (½)T of the first scan signal. Of course, it also can transmit the second scan signal at any other time. These are fallen in the protective scope of the present invention. Moreover, there are M sets of scan lines included in the first scan period T1, in which N<M−1. In such a manner, it is assured that the second scan line G12 is turned on in the first scan period T1. For example, there are 4 sets of scan lines included in the first scan period T1. After the third set of scan lines has been scanned, the first STV output signal is inputted to the second scan line G12.

The working principles of the present invention are further illustrated as follows. In practice, only one set of STV signals (i.e., the first STV input signal) is provided. Its normal scan approach is similar to a pulse timing display technique. That is, scan signals are generated according to a time sequence, starting from the first scan line G11. There is a certain time difference between the first STV input signal of the first scan line G11 and the first STV input signal corresponding to another first scan line Gn1 distanced at certain numbers of scan lines (or after a certain time interval). By adjusting WOA lines, connecting the aforesaid first STV output signal STV1 to the second scan line G12 is equivalent to generating two sets of STV signals (i.e., the first STV input signal and the second STV input signal) from a first COF.

The embodiments of the present invention connect the first STV output signal of the (N+1)th COF (i.e., the tape chip) to the second STV input signal of the first COF by adjusting WOA lines. This is equivalent to generating two sets of STV signals (i.e., the first STV input signal and the second STV input signal) from the first COF. This approach is not only simple, but also saves costs.

The embodiments of the present invention also provide a 3D display device. The 3D display device comprises the array substrate provided in the embodiments of the present invention. Since the array substrate has been described detailedly in above contents, it is not repeated herein.

In the embodiments of the present invention, the first scan line of the (N+1)th set of scan lines is connected to the second scan line of the first set of scan lines such that the vertical start pulse output signal of the first scan line of the (N+1)th set of scan lines serves as a vertical start pulse input signal of the second scan line of the first set of scan lines, and thereby turning on other second scan lines on the array substrate. There is no need to add connecting lines for inputting the vertical start pulse input signals to the second scan lines. The present invention can simplify the layout of the array substrate and reduce the costs as well.

Although the present invention has been explained by the embodiments shown in the drawings described above, it should be understood to the ordinary skilled person in the art that the invention is not limited to the embodiments, but rather various changes or modifications thereof are possible without departing from the spirit of the invention. Accordingly, the scope of the invention shall be determined only by the appended claims and their equivalents.

What is claimed is:

1. An array substrate, which comprises data lines extended along a column direction and scan lines and common electrode lines extended along a row direction, the data lines and the scan lines are perpendicular to each other and are arranged as a matrix so as to form a plurality of pixel units, each pixel unit has a pixel electrode, a first thin-film transistor, and a second thin-film transistor disposed therein;

each row of pixel units corresponds to one set of scan lines, each set of scan lines comprises a first scan line and a second scan line, the first scan line is connected to the pixel electrode via the first thin-film transistor, the second scan line is connected to the pixel electrode via the second thin-film transistor;

wherein a start end of the second scan line of a first set of scan lines is connected to a tail end of the first scan line of a (N+1)th set of scan lines such that a vertical start pulse output signal of the first scan line of the (N+1)th set of scan lines serves as a vertical start pulse input signal of the second scan line of the first set of scan lines to turn on the second scan line of the first set of scan lines, in which N is a natural number greater than or equal to 1; the first scan line has a first scan period T1, and M sets of scan lines are included in the first scan period, in which N≤M−1, and the second scan line starts to transmit a second scan signal when a first scan signal is at (T1)/2.

2. The array substrate according to claim 1, wherein the first scan line of each set of scan lines is used to input the first scan signal upon receiving the vertical start pulse input signal so as to turn on the first thin-film transistor; the data line is used to provide a pixel electrode voltage to the pixel electrode via the first thin-film transistor so as to charge up through the pixel electrode after the first thin-film transistor is turned on;

wherein the second scan line of each set of scan lines is used to transmit the second scan signal upon receiving the vertical start pulse input signal so as to turn on the second thin-film transistor; the common electrode line is used to provide a common voltage to the pixel electrode via the second thin-film transistor so as to pull down the pixel electrode voltage to the common voltage after the second thin-film transistor is turned on.

3. An array substrate, which comprises data lines extended along a column direction and scan lines and common electrode lines extended along a row direction, the data lines and the scan lines are perpendicular to each other and are arranged as a matrix so as to form a plurality of pixel units, each pixel unit has a pixel electrode, a first thin-film transistor, and a second thin-film transistor disposed therein;

each row of pixel units corresponds to one set of scan lines, each set of scan lines comprises a first scan line and a second scan line, the first scan line is connected to the pixel electrode via the first thin-film transistor, the second scan line is connected to the pixel electrode via the second thin-film transistor;

wherein a start end of the second scan line of a first set of scan lines is connected to a tail end of the first scan line of a (N+1)th set of scan lines such that a vertical start pulse output signal of the first scan line of the (N+1)th set of scan lines serves as a vertical start pulse input signal of the second scan line of the first set of scan lines to turn on the second scan line of the first set of scan lines, in which N is a natural number greater than or equal to 1.

4. The array substrate according to claim 3, wherein the first scan line of each set of scan lines is used to input a first scan signal upon receiving the vertical start pulse input signal so as to turn on the first thin-film transistor; the data line is used to provide a pixel electrode voltage to the pixel electrode via the first thin-film transistor so as to charge up through the pixel electrode after the first thin-film transistor is turned on;

wherein the second scan line of each set of scan lines is used to transmit a second scan signal upon receiving the vertical start pulse input signal so as to turn on the second thin-film transistor; the common electrode line is used to provide a common voltage to the pixel electrode via the second thin-film transistor so as to pull down the pixel electrode voltage to the common voltage after the second thin-film transistor is turned on.

5. The array substrate according to claim 3, wherein the first scan line has a first scan period T1, and M sets of scan lines are included in the first scan period, in which N≤M−1.

6. The array substrate according to claim 3, wherein the second scan line starts to transmit a second scan signal when a first scan signal is at (T1)/2.

7. A 3D display device, which comprises an array substrate, the array substrate comprises data lines extended along a column direction and scan lines and common electrode lines extended along a row direction, the data lines and the scan lines are perpendicular to each other and are arranged as a matrix so as to form a plurality of pixel units, each pixel unit has a pixel electrode, a first thin-film transistor, and a second thin-film transistor disposed therein;

each row of pixel units corresponds to one set of scan lines, each set of scan lines comprises a first scan line and a second scan line, the first scan line is connected to the pixel electrode via the first thin-film transistor, the second scan line is connected to the pixel electrode via the second thin-film transistor;

wherein a start end of the second scan line of a first set of scan lines is connected to a tail end of the first scan line of a (N+1)th set of scan lines such that a vertical start pulse output signal of the first scan line of the (N+1)th set of scan lines serves as a vertical start pulse input signal of the second scan line of the first set of scan lines to turn on the second scan line of the first set of scan lines, in which N is a natural number greater than or equal to 1.

8. The array substrate according to claim 7, wherein the first scan line of each set of scan lines is used to input a first scan signal upon receiving the vertical start pulse input signal so as to turn on the first thin-film transistor; the data line is used to provide a pixel electrode voltage to the pixel electrode via the first thin-film transistor so as to charge up through the pixel electrode after the first thin-film transistor is turned on;

wherein the second scan line of each set of scan lines is used to transmit a second scan signal upon receiving the vertical start pulse input signal so as to turn on the second thin-film transistor; the common electrode line is used to provide a common voltage to the pixel electrode via the second thin-film transistor so as to pull down the pixel electrode voltage to the common voltage after the second thin-film transistor is turned on.

9. The array substrate according to claim 7, wherein the first scan line has a first scan period T1, and M sets of scan lines are included in the first scan period, in which N≤M−1.

10. The array substrate according to claim 7, wherein the second scan line starts to transmit a second scan signal when a first scan signal is at (T1)/2.

* * * * *